(12) United States Patent
Cheung et al.

(10) Patent No.: US 11,406,896 B1
(45) Date of Patent: Aug. 9, 2022

(54) AUGMENTED REALITY STORYTELLING: AUDIENCE-SIDE

(71) Applicant: Meta Platforms, Inc., Menlo Park, CA (US)

(72) Inventors: Vincent Charles Cheung, San Carlos, CA (US); Baback Elmieh, Palo Alto, CA (US); Connie Yeewei Ho, San Jose, CA (US); Girish Patangay, Los Altos, CA (US); Mark Alexander Walsh, Simi Valley, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 978 days.

(21) Appl. No.: 16/153,658

(22) Filed: Oct. 5, 2018

Related U.S. Application Data

(60) Provisional application No. 62/682,818, filed on Jun. 8, 2018.

(51) Int. Cl.
| | | |
|---|---|---|
| *A63F 13/47* | (2014.01) | |
| *A63F 13/53* | (2014.01) | |
| *A63F 13/40* | (2014.01) | |
| *A63F 13/45* | (2014.01) | |
| *A63F 13/537* | (2014.01) | |

(52) U.S. Cl.
CPC .............. *A63F 13/53* (2014.09); *A63F 13/40* (2014.09); *A63F 13/45* (2014.09); *A63F 13/537* (2014.09); *A63F 2300/405* (2013.01); *A63F 2300/632* (2013.01); *A63F 2300/69* (2013.01)

(58) Field of Classification Search
CPC .......... A63F 13/26; A63F 13/27; A63F 13/47; A63F 2300/632
See application file for complete search history.

(56) References Cited

U.S. PATENT DOCUMENTS

| | | | | | |
|---|---|---|---|---|---|
| 4,305,131 | A | * | 12/1981 | Best ........................ | A63F 13/47 |
| | | | | | 704/E21.02 |
| 4,333,152 | A | * | 6/1982 | Best ..................... | G11B 27/105 |
| | | | | | 704/E21.02 |
| 4,445,187 | A | * | 4/1984 | Best ........................ | H04N 5/00 |
| | | | | | 463/31 |
| 4,569,026 | A | * | 2/1986 | Best ........................ | G09B 7/04 |
| | | | | | 704/E21.02 |
| 4,839,743 | A | * | 6/1989 | Best ..................... | H04N 5/9206 |
| | | | | | 386/E9.052 |
| 4,976,438 | A | * | 12/1990 | Tashiro .................... | G09B 9/22 |
| | | | | | 463/2 |

(Continued)

*Primary Examiner* — Steven J Hylinski
(74) *Attorney, Agent, or Firm* — Baker Botts L.L.P.

(57) ABSTRACT

In one embodiment, a technique includes receiving a first story fragment from a storyteller interface of a first computing system. The technique further includes displaying the first story fragment on an audience interface of a second computing system. The technique also includes detecting a trigger on the audience interface of the second computing system. In the technique, the trigger corresponds to the first story fragment. The technique also includes identifying a special effect associated with the trigger. The technique further includes outputting the special effect and the first story fragment on at least one of the storyteller interface displayed on the first computing system and the audience interface displayed on the second computing system.

20 Claims, 7 Drawing Sheets

(56) References Cited

U.S. PATENT DOCUMENTS

| | | | | |
|---|---|---|---|---|
| 5,358,259 A * | 10/1994 | Best | A63F 13/47 | 463/31 |
| 5,393,070 A * | 2/1995 | Best | A63F 13/47 | 463/37 |
| 5,393,073 A * | 2/1995 | Best | A63F 13/47 | |
| 5,835,715 A * | 11/1998 | Dahl | G09B 5/14 | 348/E7.071 |
| 6,257,982 B1 * | 7/2001 | Rider | A63F 13/27 | 463/31 |
| 7,278,920 B1 * | 10/2007 | Klamer | A63F 13/12 | 463/31 |
| 7,840,991 B2 | 11/2010 | Dusenberry et al. | | |
| 7,938,727 B1 * | 5/2011 | Konkle | A63F 13/92 | 715/764 |
| 9,019,203 B2 * | 4/2015 | Asuke | A63F 13/26 | 345/157 |
| 9,067,150 B2 | 6/2015 | Konkle | | |
| 9,749,590 B2 * | 8/2017 | Vandenbulcke | H04N 21/4755 | |
| 10,692,491 B2 | 6/2020 | Sisodia et al. | | |
| 2002/0053083 A1 * | 5/2002 | Massey | H04N 21/458 | 348/E7.061 |
| 2002/0073417 A1 * | 6/2002 | Kondo | H04N 21/439 | 348/E7.091 |
| 2002/0137565 A1 * | 9/2002 | Blanco | A63F 13/10 | 463/43 |
| 2005/0039210 A1 * | 2/2005 | Dusenberry | A63F 13/12 | 463/40 |
| 2006/0094409 A1 * | 5/2006 | Inselberg | H04H 60/63 | 455/414.1 |
| 2007/0099684 A1 * | 5/2007 | Butterworth | G11B 27/105 | |
| 2009/0122079 A1 * | 5/2009 | Nishioka | H04N 21/4622 | 381/105 |
| 2009/0186700 A1 * | 7/2009 | Konkle | G06Q 10/10 | 463/42 |
| 2010/0271396 A1 * | 10/2010 | Nemeth | G09G 3/001 | 345/641 |
| 2011/0185437 A1 * | 7/2011 | Tran | H04N 21/41265 | 726/28 |
| 2011/0195790 A1 | 8/2011 | Konkle | | |
| 2012/0086630 A1 * | 4/2012 | Zhu | A63F 13/26 | 345/156 |
| 2012/0094768 A1 * | 4/2012 | McCaddon | A63F 13/47 | 463/42 |
| 2012/0276998 A1 | 11/2012 | Zhu et al. | | |
| 2012/0309537 A1 * | 12/2012 | Nogami | A63F 13/53 | 345/682 |
| 2014/0019865 A1 * | 1/2014 | Shah | G06F 3/0484 | 715/731 |
| 2014/0080109 A1 * | 3/2014 | Haseltine | A63F 13/40 | 434/308 |
| 2014/0150009 A1 * | 5/2014 | Sharma | H04N 21/8106 | 725/28 |
| 2015/0101066 A1 | 4/2015 | Fram | | |
| 2016/0104386 A1 | 4/2016 | Kruglick | | |
| 2016/0227294 A1 | 8/2016 | Liekens et al. | | |
| 2017/0345079 A1 | 11/2017 | Rangan et al. | | |
| 2018/0165978 A1 | 6/2018 | Wood et al. | | |
| 2018/0225873 A1 * | 8/2018 | Murdock | G06F 3/011 | |
| 2020/0142388 A1 | 5/2020 | Maggiore et al. | | |

\* cited by examiner

AUGMENTED REALITY STORYTELLING: AUDIENCE-SIDE

PRIORITY

This application claims the benefit, under 35 U.S.C. § 119(e), of U.S. Provisional Patent Application No. 62/682,818, filed 8 Jun. 2018, which is incorporated herein by reference.

TECHNICAL FIELD

This disclosure generally relates to interactively storytelling over asynchronous video calls.

BACKGROUND

Asynchronous video calls provide a way for people to connect over large distances. However, long conversations may prove dull and boring for younger audiences. Accordingly, techniques for making video calls more interesting would be useful.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

This disclosure relates to a technique for increasing audience engagement in stories told over asynchronous video calls. The system described herein may be especially useful for younger audiences and/or people with shorter attention spans. In particular, a pre-scripted story may be subdivided into short, readable sections, herein referred to as story fragments. Each story fragment may be associated with one or more special effects, including visual layers, visual effects, audio layers, and audio effects. In addition, each special effect may be turned on and off via a trigger, such as vocalizing a keyword, making a hand gesture, tapping a display area, and so forth. Then, as the storyteller reads a story fragment, associated special effects may be displayed to the audience. These special effects may visually and auditorily engage audience members as they listen to a story. Accordingly, the present disclosure provides a technique for visually and auditorily enhancing a story as it is told over an asynchronous video call.

The asynchronous video call may take place on a communication device. The device may access user information in accordance with privacy settings specified by the device's owner and each user that comes within the visual field of the device. For example, the device owner may specify that under no circumstances may the device access information about anyone that is stored by the social-networking system. In this scenario, the device would not communicate with remote servers with regard to any type of user information. As another example, the device owner may specify that the device may access information stored by the social-networking system to enhance the user's experience (as will be discussed below). In this scenario, the device may communicate with the social-networking system with regard to the device owner's social-networking data, but the device will continue to check for permission to access other user's social-networking data. For example, if the device owner has opted into social-networking data access, but the device owner's friend has not opted in, the device will not access the friend's social-networking data.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

This disclosure relates to a technique for making storytelling over asynchronous video calls more engaging and interactive. In particular, the disclosure includes a suite of special effects (e.g., visual layers, visual effects, audio layers, and audio effects) that are pre-programmed into an AR engine to visual and auditorily enhance a storytelling experience. In addition, these special effects are further designed to be interactive, thereby further engaging audience members.

Figure 1:
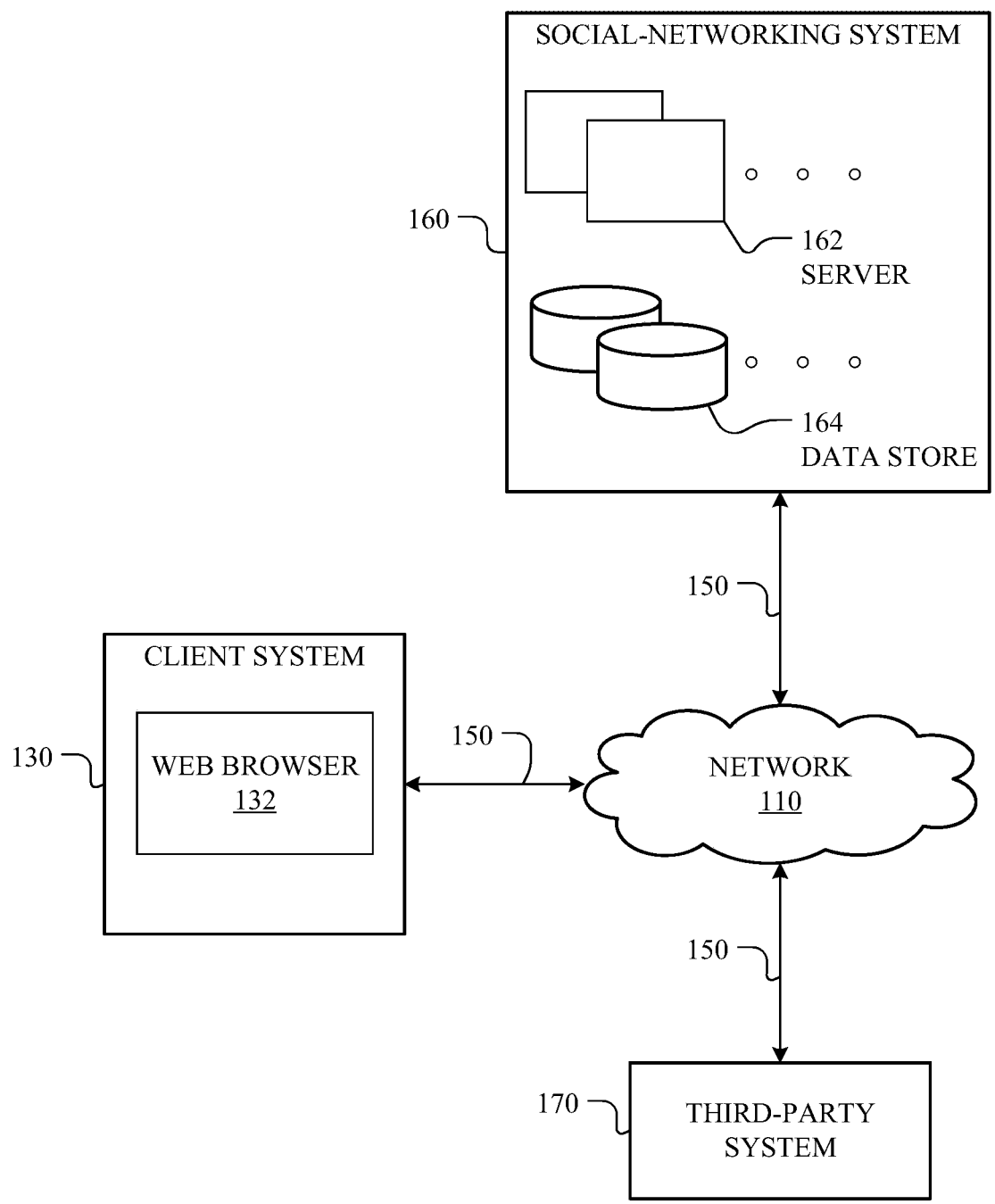
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server

162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, subject to privacy control settings of the user. Things or activities of interest may include, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, a privacy-controlled action logger, API-request server, relevance-and-ranking engine, content-object classifier, notification controller, a privacy-controlled action log, a privacy-controlled third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. The privacy-controlled logs (e.g., action log, third-party-content-object-exposure log) may only store information about a user's actions if the user has opted in to having their actions monitored and logged. If the user has not consented to such monitoring, the logs may remain empty. In particular embodiments, social-networking system 160 may include one or more user-profile stores for storing public user profiles. A user profile may include, for example, publicly disclosed biographic information, publicly disclosed demographic information, publicly disclosed behavioral information or behavioral information that the user has consented to sharing, publicly disclosed social information or social information that the user has consented to sharing, or other types of publicly disclosed descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may, subject to privacy control settings of the user, be used to receive communications from a web server about a user's actions on or off social-networking system 160. In conjunction with the action log, a third-party-content-object log may, subject to privacy control settings of the user, be maintained of user exposures to third-party-content objects. The privacy-controlled logs (e.g., action log, third-party-content-object-exposure log) may only store information about a user's actions if the user has opted in to having their actions monitored and logged. If the user has not consented to such monitoring, the logs may remain empty. A notification controller may provide information regarding content objects to a client system 130. Information may be pushed to a client system 130 as notifications, or information may be, subject to privacy control settings of the user, pulled from client system 130 responsive to a request received from client system 130. For example, if the user has not authorized the social networking system to pull information from client system 130, no information pull may be performed. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may, subject to privacy control settings of the user, be used for storing location information received from client systems 130 associated with users. Advertisement-pricing modules may, subject to privacy control settings of the user, combine social information, the current time, location information, or other suitable information to provide relevant advertisements, in the form of notifications, to a user.

Figure 2:
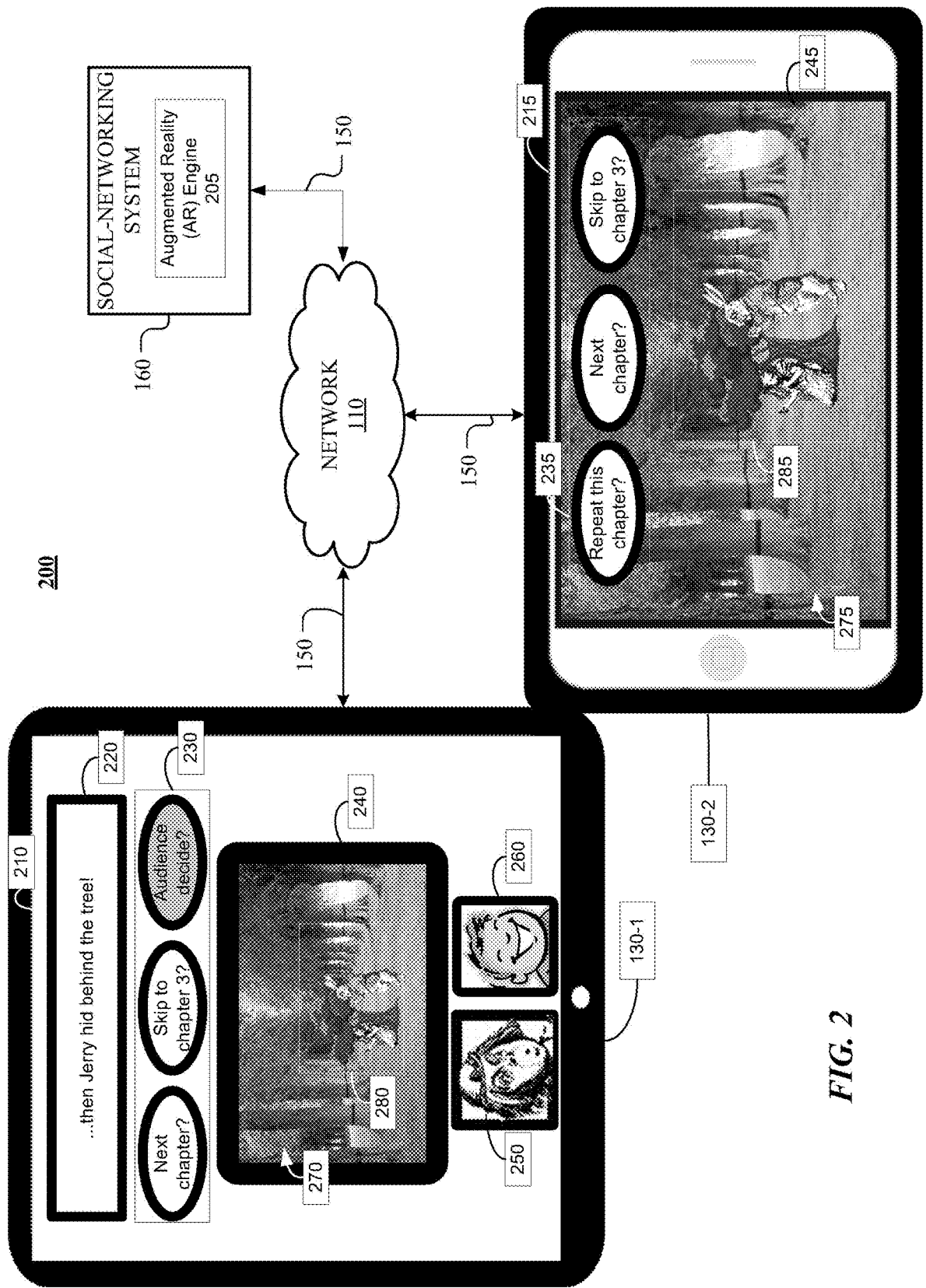
FIG. 2 illustrates an example system environment for generating an interactive storytelling experience.

FIG. 2 illustrates an example system environment 200 for generating an interactive storytelling experience. In particular, system environment 200 includes social-networking system 160, network 110, client system 130-1, and client system 130-2.

As shown in system environment 200, social-networking system 160 includes Augmented Reality (AR) engine 205. AR engine 205 configures the client system 130-1 and the client system 130-2 to generate an interactive storytelling experience, e.g., by outputting special effects, that enhance the thematic content of a story.

Client system 130-1 displays a storyteller interface 210. In particular, the storyteller interface 210 may include various elements, such as a text display 220, a story control menu 230, a visual display 240, a self-display 250, and an audience display 260. The text display 220 may provide text that a storyteller may read when telling a story. The story control menu 230 may display control options for selecting a next chapter to which to advance a story line. A story line may be divided into units of various lengths, such as chapters, scenes, and paragraphs. In addition, the story control menu 230 may allow the storyteller to transfer control to a client system 130-2. The visual display 240 may include one or more visual layers, e.g., one or more background layers 270, one or more character layers 280, one or more particle layers, one or more mask layers, etc. The self-display 250 may display a real-time image of the storyteller as the storyteller tells a story. The audience display 260 may display a real-time image of one or more audience members as the audience member(s) use the client device 130-2.

In various embodiments, one or more of the above elements of the storyteller interface 210 may be displayed by the client device 130-1. In addition, one or more additional elements may be simultaneously or sequentially displayed with the above elements of storyteller interface 210. For example, a voice effects interface may be included in storyteller interface 210 or displayed separately on client device 130-1. The voice effects interface may enable the storyteller to adjust one or more voice effects (e.g., adjusting a pitch, adding animal-like sound effects, etc.) as the storyteller tells the story. Additionally, or alternatively, one or more elements of the storyteller interface 210 may be added or removed from display, may be enlarged or reduced in sized, may overlap and/or intersect another element, and so forth. For example, if the user has opted in to having his or her facial expressions monitored, responsive to a change in expression of an audience member's face, the audience display 260 may be enlarged or reduced in size. The system may never monitor the facial expressions of minors. Any type of interface, set of interfaces, or sequence of interfaces which facilitate the telling of a story is envisioned by interface 210.

Client system 130-2 displays an audience interface 215. In particular, the audience interface 215 may include various elements, such as a story control menu 235 and a visual display 245. The visual display 245 may display one or more layer including, but not limited to, one or more background layers 275, one or more image layers 285, and/or one or more other types of layers (e.g., mask layers, animation layers, particle layers, etc.). In various embodiments, the audience interface 215 may also include one or more of a self-display, an audience display, a text display, etc. For example, in some embodiments, one or more storyteller(s) and/or one or more audience member(s) may be display within an image layer of visual display 240 (and/or visual display 245), a mask layer of visual display 240 (and/or visual display 245), and/or any other layer of visual display 240 (and/or visual display 245).

In various embodiments, the AR engine 205 may store one or more stories segmented into story fragments of one or more granularity levels (e.g., volumes, books, chapters, sections, sub-sections, paragraphs, sentences, phrases, words, etc.). In particular, depending on the display size of the client device 130-1, the AR engine 205 may adjust the number of words displayed in a story fragment. In particular, each story fragment may be associated with a sequence of visual layers displayed by visual display 240 and visual display 245, visual effects produced on visual display 240 and/or visual display 245, and audio layers and audio effects produced by client system 130-1 and/or client system 130-2.

In various embodiments visual layers may include background layers, image layers, mask layers, animation layers, particle layers, gradient layers, color layers, texture layers, and so forth. Visual effects may include animations, camera effects (e.g., panning, zooming, extrusion, etc.), transparency/opacity adjustments, etc. Audio layers may include sound tracks, background sound layers, nature sounds, ambient sounds, and so forth. Audio effects may include animal sounds, animation sounds, weather sounds, locomotion-related sound effects, voice adjustments, sounds related to story characters, thematic sounds, and so forth.

In addition, AR engine 205 may store one or more triggers which turn on and/or off visual layers, visual effects, audio layers, and audio effects. These triggers may include, for example and not by way of limitation, gesture-based triggers, audio triggers, voice triggers, time-based triggers, contact and proximity-based triggers, context-based triggers, and so forth. For example, gesture-based triggers may include, subject to privacy control settings by any relevant user (i.e., any user about whom the system accesses a remote server to request information), hand motions, facial expressions (excluding minors), gaze direction, gaze intensity, gaze shifts, body position and movements, and so forth. Audio triggers may include, subject to privacy control settings by the device owner and the relevant users, environmental sounds, such as footsteps, hand claps, tapping sounds, clicks, humming, sounds generated by a user moving, and so forth. Voice triggers may include vocalized keywords, pauses, inflections, rate of speech, pitch effects, special sounds, and so forth. Time-based triggers may include the elapse of one or more time intervals, a scheduled time, a time-of-day, an event, a holiday, and so forth. Contact triggers may include taps, swipes, double taps, tap-and-hold, knuckle taps, and so forth. In addition, context-based triggers may include a number of audience members and/or audience client systems 130-2, an audience activity level and/or an excitement level, a setting (e.g., outdoors, indoors, cloudy day, sunny day, night, etc.), and so forth.

Functionally, the AR engine 205 may subdivide a story into story fragments that are each sequentially displayed by client system 130-1 in text display 220. For example, text display 220 may output " . . . then first character hid behind the tree!" In various embodiments, the word count of the displayed story fragment may be longer or shorter depending on various parameters, such as the display size of the client device 130-1, storyteller preferences, the story content, and so forth.

In addition, the AR engine 205 may associate one or more sets of visual layers and visual effects with one or more fragments. For example, in system environment 200, the AR engine 205 may associated background layer 270 and image layer 280 with the story fragment " . . . then first character hid behind the tree!" In particular, separate image layers may be used for the first character, the tree, and for character two. Alternatively, each character may be integrated in a single image layer. In some embodiments, one or more of the storyteller and/or the audience member(s) may be displayed as characters in image layer 280. For example, the face of the character two may be replaced by the face of the storyteller. Additionally, or alternatively, the face of first character may be replaced by the face of one of the audience members. Further, a mask layer may be applied to the face of the storyteller and/or the audience member(s). The mask layer may match a character that the storyteller and/or the audience member(s) is depicting.

In addition, the AR engine 205 may associate a visual effect with the visual layer displayed on visual display 240. For example, the AR engine 205 may associated a movement effect with the fragment, " . . . then first character hid behind the tree!" For instance, the AR engine may shift the location of the first character so that first character appears to move closer to the tree. Additionally, or alternatively, the AR engine may adjust an opacity of the image layer(s) 280. In particular, the AR engine 205 may increase the opacity of the tree and/or may decrease an opacity of first character. Accordingly, first character may appear to disappear behind the tree. In various embodiments, the AR engine 205 may produce identical, similar, or different types of effects with background layers 275 and image layer 285 on visual display 245 in conjunction with producing visual effects with visual display 240. Accordingly, a storyteller viewing the storyteller interface 210 may see identical, similar, or different visual effects as an audience member viewing audience interface 215.

In addition, the AR engine 205 may associate one or more sets of audio layers and/or audio effects with the displayed fragment, " . . . then first character hid behind the tree!" For example, the AR engine 205 may configure the client system 130-1 and the client system 130-2 to play a sound track with mysterious music. Similarly, the AR engine 205 may configure the client system 130-1 and the client system 130-2 to produce audio effects associated with wind sounds, tree sounds, hiding sounds, and/or other effects that may suggest that first character is hiding behind the tree.

In various embodiments, a user may turn on and/or off one or more visual layers, visual effects, audio layers, and/or audio effects. For instance, the storyteller may turn off an audio layer. In some embodiments, a GUI menu may be displayed on client system 130-1 that allows the storyteller to turn on or off a visual layer, a visual effect, an audio layer, and/or an audio effect. For example, the storyteller may select which visual layers, visual effects, audio layers, and/or audio effects to turn on and/or off. In some embodiments, one or more of the layers and effects may be pre-selected for the storyteller, based on the story, the storyteller preferences, and the audience member(s) preferences. The storyteller may select and/or de-select menu options in storyteller interface 210 to adjust and/or personalize the pre-configured settings.

In addition, the storyteller may increase or decrease visual layers, visual effects, audio layers, and audio effects. For example, the storyteller may turn down an audio layer. Additionally, or alternatively, the storyteller may increase the size and/or opacity of a visual layer. Similarly, the storyteller may decrease the speed of a visual effect (e.g., a movement of an image layer) and/or increase a volume of an audio effect while decreasing the volume of an audio layer.

Accordingly, the AR engine 205 may store and execute special effects (visual layers, visual effects, audio layers, audio effects, etc.), and triggers. The AR engine 205 may further implement various machine learning models, natural language processing algorithms, etc. to analyze the content of a story, and to further automatically associated special effects with stories (e.g., story fragments, story chapters, etc.), segment stories (e.g., into chapters and fragments), to generate branching story lines, to associate story segments and/or branch with special effects, and further associated triggers to turn on and/or off special effects, to advance a story progression, to select a story branch, and so forth. Additionally, or alternatively, the AR engine 205 may implement various models and/or algorithms to generate recommendations for a story segmentation approach (i.e., breaking a story in to a particular set of story fragments), special effects to select and associate with story fragments (e.g., a particular visual layer to associated with a particular story fragment), and/or triggers to turn on and/or off special effects, to advance a story progression, to select a story branch, and so forth.

In addition, with respect to any and/or all embodiments described herein, the AR engine 205 may optionally automatically implement machine learning techniques and/or natural language processing to infer an action to execute and/or a recommendation to output in addition to, in parallel with, and/or instead of receiving a corresponding user input and/or detecting a corresponding trigger.

Additionally, or alternatively, the AR engine 205 may transfer control of visual displays 240 and 245 from the storyteller interface 210 to the audience interface 215, responsive to a trigger. Accordingly, the audience member(s) may increase, decrease, turn on, and/or turn off visual layers, visual effects, audio layers, and audio effects. Alternatively, the storyteller may transfer partial control to one or more audience member(s). Additionally, in embodiments with multiple client systems 130-2, the storyteller may select to which client system 130-2 to transfer control of particular functionalities. For example, the storyteller may select a menu option that causes the AR engine 205 to transfer control of visual layers to a first client system 130-2 and to transfer control of audio effects to a second client system 130-2. In addition, the first client system 130-2 may be allowed to turn on and off visual layers, while the second client system 130-2 may only be allowed to add new audio effects, without being able to turn off audio effects.

In various embodiments, the storyteller may tell a story by reading sequentially displayed story fragments. In particular, when a storyteller finishes reading a story fragment, the storyteller may select an input button on storyteller interface 210. Selecting the input button may trigger AR engine 205 to output a next story fragment for display in text display 220. In addition, AR engine 210 may update one or more visual layers, visual effects, audio layers, and audio effects displayed on visual display 240 and visual display 245 and/or outputted by client system 130-1 and client system 130-2.

Additionally, or alternatively, the AR engine 205 may automatically update the story fragment displayed by text display 210, as well as the visual layer 240, the visual layer 245, the client system 130-1, and the client system 130-2, at the elapse of a pre-determined time interval. For example, the AR engine 205 may update the story fragment every 5 seconds. Alternatively, the AR engine 205 may detect a pause and/or may use natural language processing to detect the storyteller reading the last word of a story fragment to determine when to display the next story fragment. Although specific examples for how the AR engine 205 advances a story have been provided, any trigger or technique for detecting or determining when to advance a story within the scope of this disclosure.

In various embodiments, at the conclusion of a story segment (i.e., a set of story fragments, such as a chapter), the AR engine 205 may generate a story control menu 230 that allows the storyteller to choose how to advance the story. For example, as shown in system environment 200, the storyteller may select to advance to the next chapter by selecting the "Next chapter?" menu option. When the AR engine 205 detects the selection of the "Next chapter?" input option, then the AR engine 205 may output the first fragment of the next chapter to the text display 220 for display. In addition, the AR engine 205 may output corresponding visual layers and visual effects to the visual display 240 and the visual display 245 for display. The AR engine 205 may further configure the client device 130-1 and the client device 130-2 to output updated audio layers and audio effects.

Alternatively, the storyteller may select the "Skip to chapter 3?" menu option. Accordingly, when the AR engine 205 detects the selection of the "Skip to chapter 3?" menu option, then the AR engine 205 may output story fragments, visual layers, visual effects, audio layers, and audio effects to the storyteller interface 210, the client system 130-1, the audience interface 215, and the client system 130-2 that correspond to chapter 3 of the story.

Furthermore, responsive to a trigger, the AR engine 205 may transfer control from the storyteller interface 210 to the audience interface 210. For example, the AR engine 205 may enable a display menu on the audience interface 215 that enables the audience member to select how to advance the story. For example, as shown in system environment 200, the storyteller may select the "Let audience decide?" menu option. Accordingly, when the AR engine 205 detects that the storyteller selected the "Let audience decide?" option, then the AR engine 205 may transfer control over to the audience device 130-2. For example, the AR engine 205 may output a menu option 235 for display on audience interface 215. In particular, the menu option 235 may display menu options that allow the audience member(s) to select whether to repeat the current chapter, to advance to the next chapter, or to advance to chapter 3. The audience member(s) may tap a menu option displayed on audience interface 215 to select how to advance the story. When the AR engine 205 receives the audience selection, the AR engine 205 may revert control back to the storyteller interface 210, while updating the storyteller interface 210, the audience interface 215, the client system 130-1, and the client system 130-2 with story fragments and associated layers and effects that corresponds to the audience member's selection.

Although a specific technique for determining how to advance a story is presented, any technique for determining how to advance a story is within the scope of the disclosure. For example, the AR engine 205 may configure the client device 130-1 to produce an audio prompt. Responsive to the audio prompt, the AR engine 205 may detect and interpret a gesture performed by the storyteller to determine how to advance the story. Additionally, or alternatively, the AR engine 205 may, subject to privacy control settings of the device owner and any relevant user, access social graph information to infer how to progress a story, with or without explicit storyteller/audience member prompting.

In various embodiments, the AR engine 205 may enable multi-person video calling and/or storytelling. For example, two or more client systems 130-2 may be implemented in system environment 200. The AR engine 205 may further display instances of the audience interface 215 on each client system 130-2. Additionally, or alternatively, two or more client systems 130-1 may be implemented in system environment 200. The AR engine 205 may further display instances of the audience interface 210 on each client system 130-1.

In addition, the AR engine 205 may implement an audience polling technique for in embodiments with one or more client systems 130-2. For instance, the AR engine 205 may output a selection menu for display on each client system 130-2. The AR engine 205 may then identify for advance the story (i.e., selecting a next chapter, selecting a story branch, selecting a next story, etc.). In some embodiments, the AR engine 205 may implement a voting mechanism based on majority vote. Additionally, or alternatively, the AR engine 205 may implement an audience engagement test. For example, the AR engine 205 could instruct the audience members to yell for the option that they prefer. The AR engine 205 could analyze audio input data from each of the client systems 130-2 and identify the menu option that corresponds to the highest decibel count. The AR engine 205 could then proceed with the story chapter associated with the identified menu option. Although a specific technique for audience polling is described above, any technique for determining a group selection is within the scope of the disclosure. For example, the AR engine 205 may implement a voting mechanism, whereby each audience member may independently vote on how a story should proceed. Additionally, or alternatively, the AR engine may use a crowd voting method, such as detecting for which option the audience members cheer the loudest, cheer at the highest pitch, appear to be the most animated, and so forth. When multiple client system s 130-2 are used, the AR engine 205 may add, compare, and/or otherwise combine the sound or activity level detected by each audience device when determining the winning option in a vote.

In addition, any of the techniques described herein may be implemented in embodiments with two or more users using client system 130-1 and/or two or more users utilizing client system 130-2.

In addition, the storyteller interface 210 may include a self-display 250 and/or an audience display 260. In various embodiments, the AR engine 205 may turn on and/or off the self-display 250, may enlarge or reduce the size of the self-display 250 based on user input. Additionally, the AR engine 205 may adjust the size of the self-display 250 based on the story fragment display in text display 220, the visual display 240, the audience display 260, and so forth. For example, if, subject to privacy control settings of the device owner and any relevant user, the AR engine 205 determines there is high engagement in the audience display 260 (frequency changes of facial expression, intent gazing at the client system 130-2, etc.), then the AR engine 205 may reduce the size of the self-display 250 and increase the size of the audience display 260 to allow the storyteller to more easily view audience reactions to the story. Similarly, if the AR engine 205 increases the brightness of visual layers and/or the speed and/or intensity of visual effects, then the AR engine 205 may reduce the size of the self-display 205 to allow the storyteller to more easily view changes in the visual display 240. Conversely, if audience engagement is low, the AR engine 205 may increase the size of the self-display 250. Accordingly, the increased size of the self-display 250 may assist the storyteller in assessing and improving his presentation.

In various embodiments, the audience interface 215 may also include a self-display and a storyteller display. The self-display and the audience display may be controlled via the storyteller interface 210, the audience interface 215, or both with the storyteller interface 210 having override privileges.

In further embodiments, the AR engine 205 may project an image of the storyteller into image layers of the visual display 240. For example, in system environment 200, the AR engine 205 may project the image of the storyteller into the image layer of first character when reading story fragments related to first character. The AR engine 205 may further project the image of the storyteller into the image layer of a second character, when the text display 220 displays story fragments associated with the second character. The AR engine 205 may also project the image of the storyteller into the image layer of the tree, when the text display 220 displays the text " . . . then first character hid behind the tree!" In addition, the AR engine 205 may implement one or more voice effects to adjust the voice of the storyteller to mimic the voice features of the assumed character. For example, when projecting the storyteller's image into the character layer of first character, the AR engine 205 may increase the pitch of the voice of the storyteller and add squeak-type and/or mouse-type voice effects to the audio signal received by the audience client system 130-2 for output to the audience member(s).

In various embodiments, the AR engine 205 distinguishes between public information and private information. In particular, the AR engine 205 displays public information is viewable on the storyteller interface 210 on the client system 130-1 and on the audience interface 215 on the client system 130-2. However, The AR engine 205 only displays private information on either the storyteller interface 210 on the client system 130-1 or on the audience interface 215 on the client system 130-2. For example, in some embodiments, the AR engine 205 designates story fragments displayed in text display 220 as private information. Accordingly, story fragments are not visible in the audience interface 215. However, the AR engine 205 designates visual layers displayed in visual display 240 as public information. Thus, visual layers are visible on visual display 245 in the audience interface 215. For example, trigger menu options may be displayed as private information on the storyteller interface 130-1.

In various embodiments, the AR engine 205 may provide a menu option that allows the storyteller to identify what information is private and what information is public. Similarly, the AR engine 205 may provide a menu option in the audience interface 215 to allow the audience members to select what information is public and what information is private. For example, the AR engine 205 may receive user input via audience interface 215 that corresponds to a selection to designate a display area including the audience member's face as private information. Accordingly, the AR engine 205 may block the audience member's face from being displayed in audience display 260 in storyteller interface 210. Similarly, the AR engine 205 may receive user input via storyteller interface 210 that corresponds to a selection to designate an area of the storyteller's environment as private information. Accordingly, the AR engine 205 may block the designated area of the storyteller's environment from being viewable on the audience interface 215.

In particular, in some embodiments, the AR engine 205 may limit the displayed area around a storyteller. For example, the displayed area may be limited to the area around a user's face, body, hand, and objects proximate to the user. This may reduce distractions for a audience member, while providing privacy for the storyteller. In addition, The AR engine 205 may execute an automated camera system to center an image of the displayed storyteller(s) and/or and audience member(s) with respect to visual display 240 and/or visual display 245. Accordingly, visual layers may be applied without having to adjust for the user's orientation with respect to the displayed area. When executed by the AR engine 205, the automated camera module may automatically select one or more objects and/or one or more areas of a scene on which to focus, in addition to automatically selecting one or more other view characteristics (e.g., a view angle, a view area, a camera effect, a shutter effect, etc.). The automated camera may further automatically update the various characteristics (e.g., the view area, focus area, a target, various camera effects, etc.). In particular, the AR engine 205 may include and/or execute any and/or all of the systems described in the following references hereby incorporated by reference: U.S. patent application Ser. No. 15/856,105, filed 28 Dec. 2017; U.S. patent application Ser. No. 15/856,108, filed 28 Dec. 2017; U.S. patent application Ser. No. 15/856,109, filed 28 Dec. 2017; and U.S. patent application Ser. No. 15/949,011, filed 9 Apr. 2018.

In various embodiments, based on a default privacy setting and/or a privacy setting of a user (e.g., one or more storytellers, one or more audience members, etc.) the AR engine 205 may restrict information displayed on the storyteller interface 210 and/or the audience interface 215. In some embodiments, the default privacy setting may be generated based on a setting (e.g., a surrounding, the type of room, etc.) of the storyteller, a setting of the audience member(s), and/or an age of the storyteller and/or audience member(s). For example, if one or more of the storyteller and/or the audience member(s) are minors, then a strict privacy setting may be implemented. In particular, the AR engine 205 may replace an image of a face (e.g., of a storyteller, of an audience member, etc.) with an illustration (e.g., an illustration of a face, a vector graphic rendition of a face, an Avatar, and so forth. In addition, the AR engine 205 may transmit user expressions and/or reactions by selecting an illustration with an expression that matches a detected expression on the corresponding user. For example, the AR engine 205 may select an Avatar with a smiling expression and further display the Avatar on the storyteller interface 210 based on determining that an audience member smiled. In additional embodiments, the AR engine 205 may display a group of Avatars to represent two or more audience members.

In addition, the AR engine 205 may enable a moderator capability. Accordingly, the AR engine 205 may route the information displayed on the storyteller interface 210 and/or the audience interface 215 by a moderator interface. The AR engine 205 may output visual and/or audio information from a storyteller interface 210 and/or an audience interface 215 to the moderator interface 215. In various embodiments, the AR engine 205 may implement a time delay before transmitting content to the storyteller interface 210 and/or the audience interface 215. During the time delay, the AR engine 205 may output the content on the moderator interface. In addition, the AR engine 205 may edit the content responsive to user input via one or more moderator controls. For example, the moderator interface may include one or more controls that enable a user of the moderator interface select content for editing (e.g., select an audio layer and/or a visual layer for removal. For example, by selecting a control. The AR engine 205 may remove 3 seconds of an audio layer from the content outputted by the audience interface 215. Accordingly, the audience device 130-2 may not output the audio layer on the audience interface 215 during the 3-second interval. Similarly, by selecting another control on the moderator interface, the AR engine 205 may remove visual content from display for a particular time interval. For example, by selecting a third control, the AR engine 205 may turn off the audience display on the storyteller interface 210 for a set amount of time. Accordingly, the moderator interface may enable filtering of content transmitted between the storyteller interface 210 and the audience interface 215. In further embodiments, a moderator bot may be implemented that automatically filters out offensive content transmitted between the storyteller interface 210 and the audience interface 215.

Moreover, the audience interface 215 may enable audience members to provide feedback to a storyteller. In particular, the audience interface 215 may enable audience members to make requests that are displayed on the storyteller interface 210. For example, audience members could request that the storyteller speak lower, that the storyteller read a different story, etc. Similarly, the storyteller interface 210 may enable storytellers to provide feedback to the audience. For example, the storyteller could select an input option that causes a 5-star rating to appear on the audience interface 215. Accordingly, the storyteller could choose to provide feedback to audience members regarding audience participation.

Furthermore, the AR engine 205 may enable recording and replaying of the storyteller-side of a story and/or the audience-side of a story. For example, responsive to a trigger, the AR engine 205 may record some or all of storyteller interface 210, including visual display 240, self-display 250, audience display 260, text display 220, as well as audio layers and audio effects. Similarly, responsive to the same trigger and/or a second trigger, the AR engine 205 may record some or all of audience interface 215, including visual display 245, as well as audio layers and audio effects. In addition, responsive to one or more triggers, the AR engine 205 may replay a recorded content of the storyteller interface 210 and/or the audience interface 215. For example, the AR engine 205 may replay a story at any granularity level, such as chapter-by-chapter replays, sentence fragment-by-sentence fragment replays, section-by-section replays, sub-section-by-sub-section replays and so forth.

Figure 4:
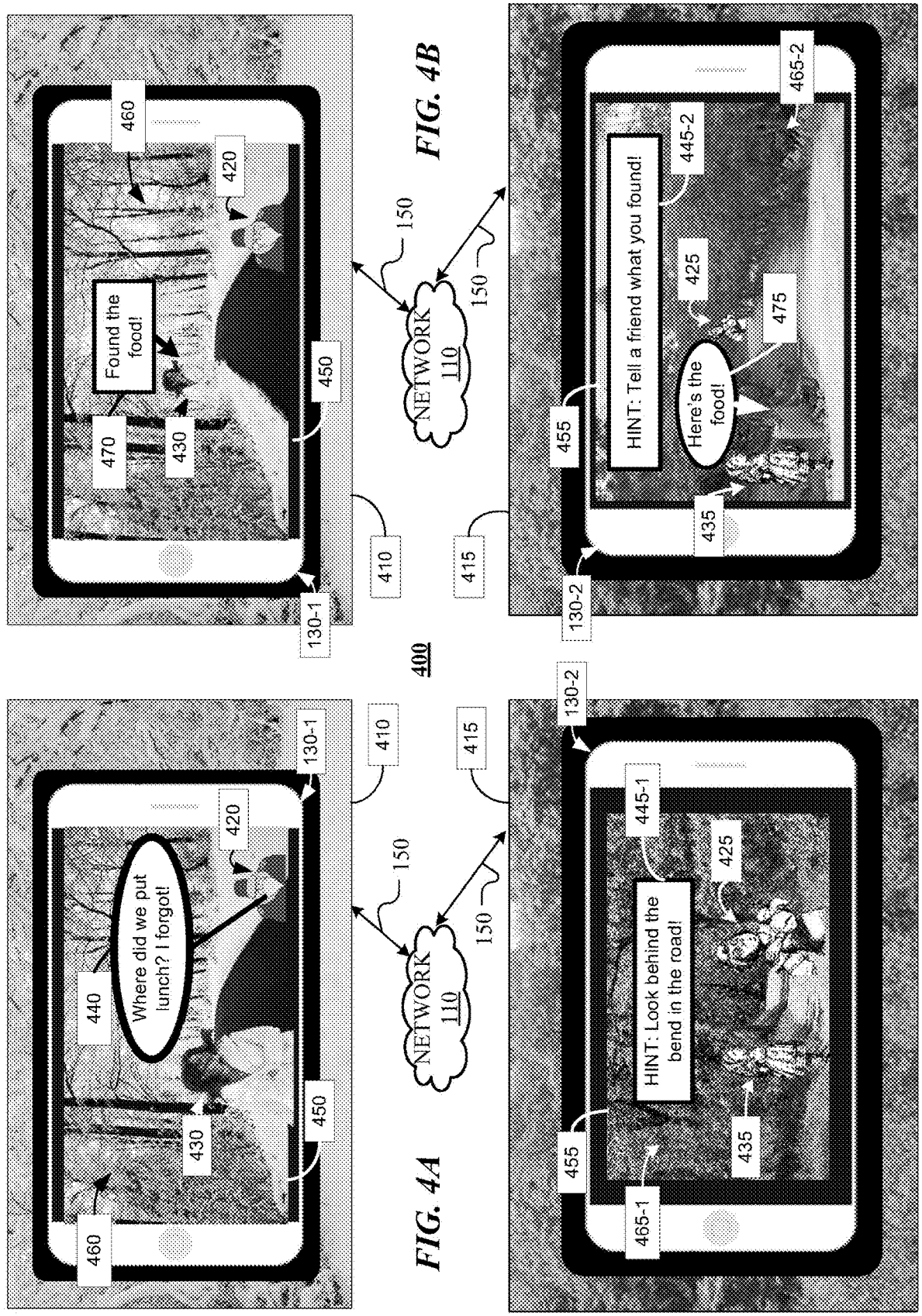
FIG. 4A illustrates an example system environment displaying context-based story modification.
FIG. 4B illustrates an example system environment displaying various camera effects that can be performed by an AR engine.

In addition, responsive to a trigger, the AR engine 205 may enable memory recall triggered by the storyteller with answers displayed on the audience interface 215. In particular, The AR engine 205 may generate a question about a story event that occurred previously in a storyline. The AR engine 205 may display answer hints, partial answers, and/or full answers on the audience interface 210. Further examples of AR engine 205 assisted memory recall is described in further detail in FIG. 4.

In various embodiments, the AR engine 205 may associate a character within story with a particular instance of a storyteller interface 210 and/or a particular instance of an audience interface 215. Accordingly, the AR engine 205 may output story fragments associated with a particular character for display on the client system associated with the corresponding instance of the particular storyteller interface 210 and/or audience interface 215.

Figure 3:
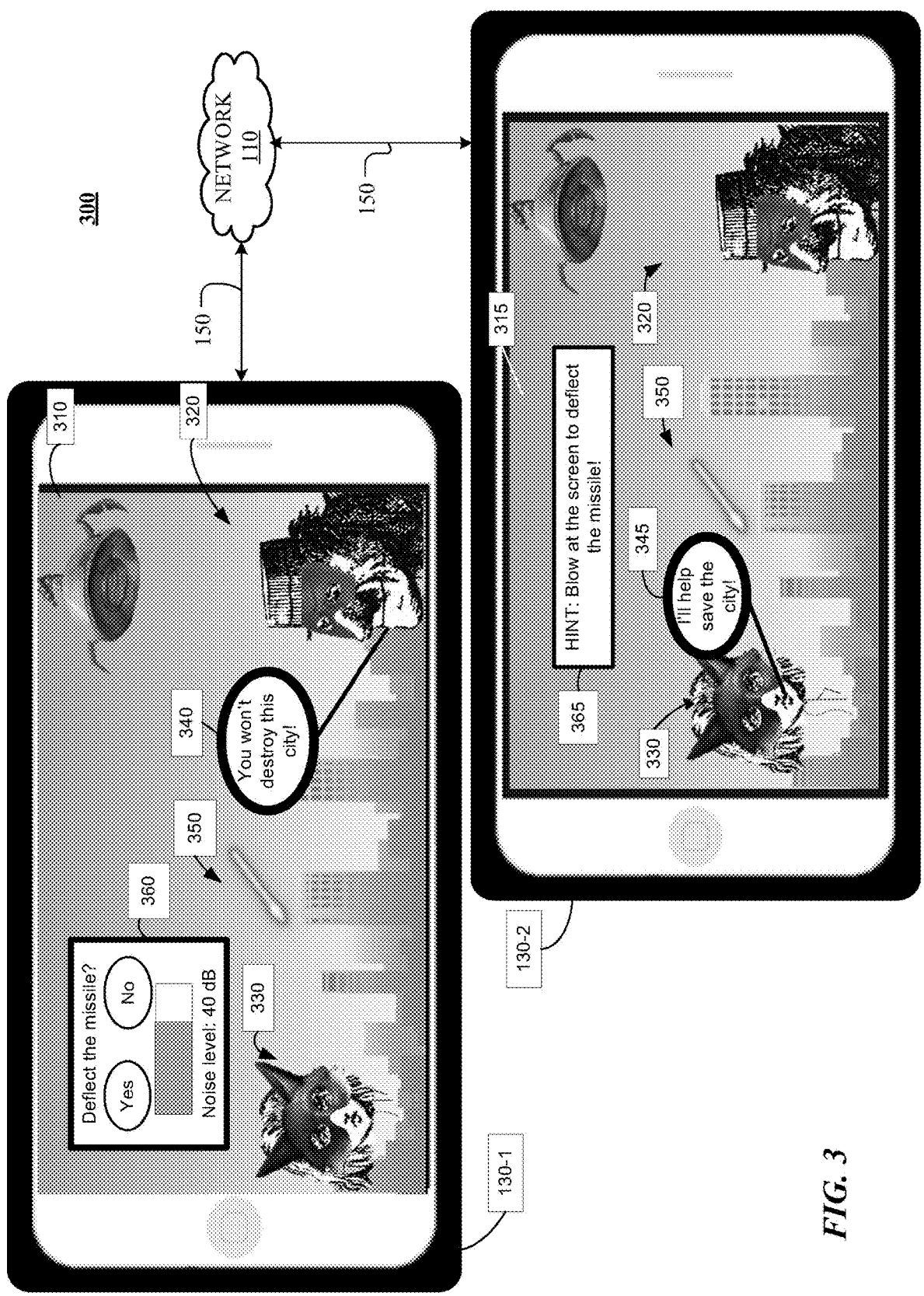
FIG. 3 illustrates an example system environment for enabling audience involvement in an interactive storytelling experience.

FIG. 3 illustrates an example system environment for enabling audience involvement in an interactive storytelling experience. In particular, system environment 300 includes social-networking system 160 that includes the AR engine 205 (not shown), network 110, client system 130-1, and client system 130-2. Client system 130-1 includes storyteller interface 310. Storyteller interface 310 includes mask layer 320, mask layer 330, text display 340, background/particle layer 350, and decision menu 360. Client system 130-2 includes audience interface 315. Audience interface 315 includes mask layer 320, mask layer 330, text display 345, background layer 350, and action step 365.

As described above, the AR engine 205 distinguishes between private information and public information. For example, mask layer 320 and mask layer 330 are displayed on both storyteller interface 310 and audience interface 315.

Similarly, background/particle layer 350 is displayed on both client system 130-1 and client system 130-2. Accordingly, the AR engine 205 enables users of the storyteller interface 310 and users of the audience interface 315 to assume characters within a collaborative storytelling experience. In particular, storytelling interface 310 displays a text display 340 that displays text for a first character, and audience interface 315 displays text display 345 that displays text for a second character. In various embodiments, the AR engine 205 treats text display 340 and text display 345 as private information. Accordingly, users of storytelling interface 310 cannot see the content of text display 345 associated the audience story character. Similarly, users of the audience interface 315 cannot view the contents of text display 340 associated with the storyteller story character.

In various embodiments, the AR engine 205 may generate a mask layer in front of an image layer of a user. For example, the mask layer 330 is displayed in front of the face of a user of the audience interface 315. Similarly, the mask layer 320 is displayed in front of the face and bust of a user of the storyteller interface 310. In particular, a camera disposed in client system 130-1 images the storyteller user and a camera in client system 130-2 images the audience user. In various embodiments, the AR engine 205 adjust the view area of a camera to center the image of the user within the view area of the camera. Accordingly, visual layers may be applied to the user image layer without additional computation.

In further embodiments, the background/particle layer may include various effects, including gradient layers, particle layers, and so forth. In particular, in system environment 300, the background/particle layer display a green missile emitted by an alien ship. The AR engine 205 may further generate a visual effect to animate the missile. For example, the AR engine 205 may cause the missile to move away from the alien ship and towards the city. However, other animations are within the scope of the disclosure. For example, the AR engine 205 may generate an animation effect that displays a building shaking, collapsing, exploding, and so forth. Additionally, or alternatively, the AR engine 205 may generate an animation effect that causes the alien ship to move left, right, up, down, to enlarge, to shrink, to disappear, to glow, and so forth.

In various embodiments, the AR engine 205 may enable role-swapping of the storyteller and the audience responsive to a trigger (e.g., a gesture). For example, the AR engine 205 may output the storyteller interface 210 to the client system 130-2, thereby enabling the full functionality of the storyteller interface 210 on the client system 130-2. Accordingly, users of client system 130-2 may role-swap from being audience members to becoming storytellers. Similarly, responsive to the above trigger and/or a second trigger, the AR engine 205 may output the audience interface 215 to the client system 130-1, thereby enabling the full functionality of the audience interface 215 on the client system 130-1. Accordingly, users of client system 130-2 may role-swap from being audience members to becoming storytellers. Furthermore, responsive to a trigger, the AR engine 205 may reverse the role-swapping. Accordingly, the AR engine 205 may output the storyteller interface 210 for display on the client system 130-1 and further output the audience interface 215 for display on the client system 130-2, thereby reinstating the user(s) of client system 130-1 as the storyteller and reinstating the user(s) of client system 130-2 as audience member(s).

System environment 200 displays an example of enabling audience members participate in storytelling. In particular, responsive to the trigger keyword "city", the AR engine 205 may output text to the audience interface 215 to enable audience members to read story fragments. For example, the AR engine 205 may generate text display 340 that includes a story fragment on storyteller interface 310. The storyteller may read the story fragment, "You won't destroy this city!". When the AR engine 205 detects that the storyteller spoke the word "city", the AR engine 205 may output text display 345 including the next story fragment on audience interface 315. The audience member may read the story fragment, "I'll help save the city!". When the AR engine 205 detects that the audience member spoke the word "city", the AR engine 205 may output the action step 365 for display on the audience interface 315.

In some embodiments, the storyteller may select a menu option to trigger the AR engine 205 to display action step 365. Alternatively, the AR engine 205 may be pre-programmed to output the action step 365 upon detecting that the audience member finished reading the story fragment displayed in text display 345. In system diagram 300, the action text instructs the audience members to "blow at the screen to help deflect the missile!" However, any instruction that causes audience members to participate in a storytelling experience is within the scope of the disclosure. In particular, completing the action of blowing on the screen may increase audience member engagement.

Functionally, the AR engine 205 receives detection data from client system 130-2 that may indicate an amount of force produced on the screen by the audience members blowing at the missile. Additionally, or alternatively, the AR engine 205 may receive a sound volume detected by the client system 130-2 produced by the audience members blowing at the missile. Other detection techniques may also be implemented, such as using a camera disposed on the client system 130-2 to detect an activity level of the audience member(s) as they blow at the screen. Any technique that determines whether audience members responded to the action step 365 is within the scope of this disclosure.

In various embodiments, the AR engine 205 may trigger a visual effect and/or an audio effect when a threshold is exceeded. For example, if the volume level exceeds 45 decibels (dB), the AR engine 205 may trigger an animation effect. For example, the AR engine 205 may cause the missile to move upwards and away from the city. Additionally, or alternatively, the AR engine 205 may display a decision menu 360 on the storyteller interface 310. The decision menu 360 may display a detection level (e.g., 40 dB) and provide an input field that allows the storyteller to select what action the AR engine 205 should take. For example, if the AR engine 205 receives input to not deflect the missile, then the AR engine 205 may generate an animation effect to cause the missile to crash into the city. However, if the AR engine 205 receives input to deflect the missile, then the AR engine 205 may generate an animation effect to cause the missile to fly away from the city.

In various embodiment, the AR engine 205 may further select a next chapter to which to advance the story. In particular, the AR engine 205 may be pre-configured to advance to a particular chapter based on the audience member response to action step 365 and/or the storyteller selection in decision menu 360. For example, if the AR engine 205 determines that the missile should not be deflected, then the AR engine 205 may advance the story to a first chapter. The AR engine 205 may further update the visual layer, audio layer, visual effect, and audio effects based on the selected chapter and further output a first story fragment of the selected first chapter. Alternatively, if the AR engine 205 determines that the missile should be deflected, then the AR engine 205 may advance the story to a second chapter. Accordingly, the AR engine 205 may implement branching storylines based on received storyteller input from decision menu 360, and/or detected audience responses to action step 365.

In some embodiments, the AR engine 205 may display a menu option on storyteller interface 310 and/or audience member interface 315 that enables the user to trigger an action reset. In particular, responsive to a user selection of the reset option, the AR engine 205 may reset the storyline to a point within a previous chapter and/or to a point within a current chapter. For instance, responsive to user input, the AR engine 205 may reset the storyline to a point prior to displaying the decision menu 360 on storyteller interface 310 and/or to a point prior to displaying the action step 365 on audience interface 315. Resetting a storyline may include updating visual layers, audio layers, visual effects, and audio effects to match a story fragment from a previous point in a story.

FIG. 4A illustrates an example system environment displaying context-based story modification. In FIG. 4A, system environment 400 includes physical environment 410 and physical environment 415. Physical environment 410 includes client system 130-1. Client system 130-1 includes storyteller interface 450, image layer 420, image layer 430, text display 440, and background layer 460. In addition, physical environment 415 includes client system 130-2. Client system 130-2 includes audience interface 455, background layer 465-1, image layer 425, image layer 435, and action step 445-1. In various embodiments, image layer 420 may correspond to a character portrayed by the storyteller, and image layer 430 may correspond to a character portrayed by the audience member.

In system environment 400, physical environment 410 and physical environment 415 represent contextually-distinct locations. Contextually-distinct locations are physically separate, culturally-distinct areas. For example, physical environment 410 is a winter environment, while physical environment 415 is a tropical environment. In addition, cultural events and activities in physical environment 410 may be distinct from cultural events and activities which occur in physical environment 415. In various embodiments, the AR engine 205 receives, subject to privacy control settings of the device owner and the relevant user, contextual information from social graph nodes and edges associated with the user of client system 130-1, the user of client system 130-2, the physical environment 410, and the physical environment 415, and so forth. The AR engine 205 further uses this data to determine how to modify visual layers, visual effects, audio layers, and audio effects displayed by storyteller interface 450 and audience interface(s) 455.

For example, in system environment 400, storyteller interface 450 displays a background layer 460 which depicts a winter climate. The AR engine 205 may select the background layer 460 based on the climate of physical environment 410. Similarly, the audience interface 455 displays a background layer 465-1 which depicts a tropical climate. The AR engine 205 may also select the background layer 465-1 based on the climate of physical environment 415. Furthermore, the AR engine 205 modify the characters depicted in image layer 420 and image layer 430 based on the selected climate and/or context clues. For example, the character in image layer 430 wears a scarf and the character in image layer 420 wears a thick coat. Similarly, the AR engine 205 modify the image layer 425 and image layer 435 by selecting and displaying characters that are typically portrayed in tropical climates (e.g., the Dora character). Accordingly, image layer 425 on client system 130-2 may be a regionally-adjusted version of image layer 420 on client system 130-1. Similarly, image layer 435 on client system 130-2 may be a regionally-adjusted version of image layer 430 on client system 130-1.

In further embodiments, the AR engine 205 may modify visual layers, visual effects, audio layers, and audio effects to reflect dates of interest, user activity preferences, user contextual preferences, and so forth. For example, the AR engine 205 may target regionally relevant holiday cheers to each client device 130-1 and each client device 130-2 that is part of a holiday-related storytelling experience using geographical data and user preferences.

However, the AR engine 205 may ensure that the background layer 460 displayed on storyteller interface 450 and the background layer 465-1 displayed on audience interface 455 retain fundamental similarities. For example, the background layer 460 and the background layer 465-1 both include a road surrounded by trees. In addition, there is a bend at the end of both roads. Furthermore, the relative position of the image layer 420 and image layer 430 in storyteller interface 450 is similar to the relative position of image layer 425 and image layer 435 in audience interface 455.

In addition, text display 440 may display a question to be posed to audience members viewing the audience interface 455. For example, in system environment 400, the text display 440 on storyteller interface 450 may display the story fragment, "Where did we put lunch? I forgot!" In response to the storyteller reading the story fragment, the AR engine 205 may generate an action step 445-1 on audience interface 455 that suggests an answer to the posed question. In particular, the action step 445-1 tells the audience member to, "look behind the bend in the road!" Responsive to a trigger (e.g., a user gesture, adjusting the position and/or orientation of the client system 130-2, tapping the interface 455, etc.), the AR engine 205 may modify a displayed area in interface 455.

Additionally, or alternatively, the AR engine 205 may display a multiple-choice question menu on the audience interface 455, where the audience member(s) may select an answer by a gesture and/or the AR engine may detect audible answers spoken by the audience members.

FIG. 4B illustrates an example system environment 400 displaying various camera effects that can be performed by AR engine 205. In FIG. 4B, system environment 400 includes physical environment 410 and physical environment 415. Physical environment 410 includes client system 130-1. Client system 130-1 includes storyteller interface 450, image layer 420, image layer 430, text display 470, and background layer 460. In addition, physical environment 415 includes client system 130-2. Client system 130-2 includes audience interface 455, background layer 465-2, text display 475, image layer 425, image layer 435, and action step 445-2. Similar to FIG. 4A, image layer 420 may correspond to a character portrayed by the storyteller, and image layer 430 may correspond to a character portrayed by the audience member. Also, image layer 425 on client system 130-2 may, subject to privacy control settings of the device owner, be a regionally-adjusted version of image layer 420 on client system 130-1. Similarly, image layer 435 on client system 130-2 may be a regionally-adjusted version of image layer 430 on client system 130-1.

In FIG. 4B, the AR engine 205 dynamically and individually controls camera effect generated by interface 450 on client system 450 and generated by interface 455 on client system 130-2. With respect to interface 455 on client system 130-2, responsive to user input, the AR engine 205 pans forward and rotates the viewable area the background image 465-1 in FIG. 4A to produce the background image 465-2 in FIG. 4B. Accordingly, responsive to user input, the AR engine 205 enables the audience member(s) to simulate walking along the road and looking around the corner. User inputs may include any of the above-mentioned triggers, such as contact triggers, swipe gestures, non-contact gestures, voice commands, and so forth. Accordingly, the AR engine 205 may respond to user inputs to enable a user to control the viewable area of background layer 465-2 in interface 455.

Furthermore, when the search object (e.g., food) appears in the viewable area, the AR engine 205 may generate a text display 475 that indicates the location of the search object. In addition, the AR engine 205 may output a second action step 445-2. In particular, action step 445-2 may instruct the user to "Tell a friend what you found!". Accordingly, the AR engine 205 may assist an audience member(s) in finding an answer to a question posed by a storyteller. In addition, the AR engine 205 may enable multiple client systems 130-1 to independently search separate areas of a scene.

With respect to interface 450 on client system 130-1, the AR engine 205 may modify the position of the image layer 430 corresponding to the audience member responsive to inputs received via interface 455 on client system 130-2. Accordingly, AR engine 205 may update the position and size of the image layer 430 in real-time to cause the image layer 430 to appear to move along the road and around the corner. In addition, when the search object (e.g., food) enters the viewable area of the audience interface 455, the AR engine 205 may generate a text display 470 in the storyteller interface 450 that informs the storyteller that the audience member has successfully found the search object. Accordingly, the AR engine 205 may facilitate the storyteller in monitoring the audience member's progress in finding an answer to a posed question.

Figure 5:
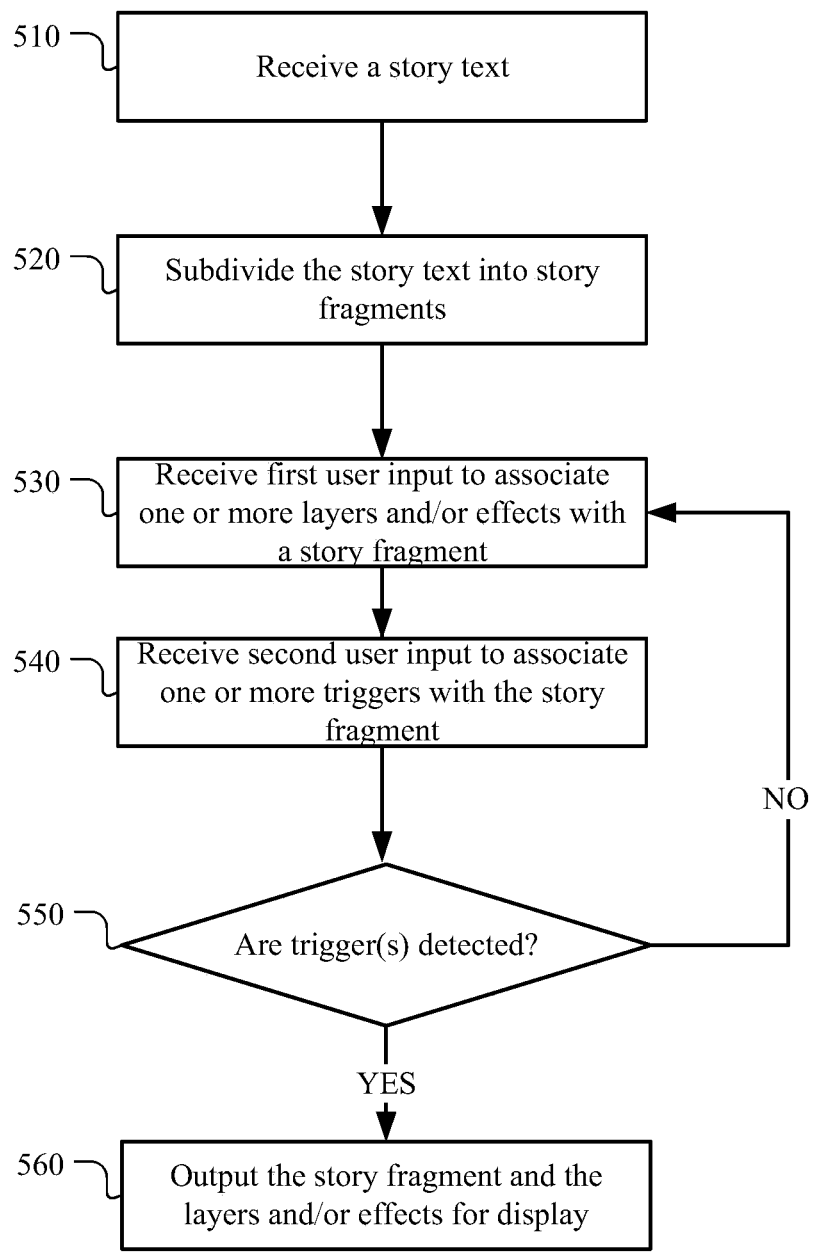
FIG. 5 illustrates an example method for generating an interactive story.

FIG. 5 illustrates an example method 500 for generating an interactive story. The method may begin at step 510, where the AR engine 502 receives a story text. The story text may include one or more characters and may include one or more branch points. At step 520, the AR engine 502 subdivides the story into story fragments. The size of each story fragment may depend on various parameters, including, but not by way of limitation, the display size of a of the client device 130-1 the display size of the client device 130-2, the storyteller preferences, the audience preferences, etc.

At step 530, the AR engine 502 receives first user input to associate one or more layers and/or effects with a story fragment. Layers may include visual layer (e.g., a character layer) and audio layers (e.g., a sound track). Effects may include visual effects (e.g., animations) and audio effects (e.g., animal sounds).

At step 540, the AR engine 502 receives second user input to associate one or more triggers with the story fragment. For example, the AR engine 502 may receive user input that associates a gesture-based trigger with an animation. Additionally, or alternatively, the AR engine 502 may receive user input that associates a detected force applied to client system 130-2 with a selection of a branch of a storyline.

At step 550, the AR engine 502 determines if the one or more triggers are detected. If the trigger(s) are detected, then the method 500 proceeds to step 560 where the AR engine 502 outputs the story fragment and the layers and/or effects for display. If the trigger(s) are not detected, then the method 500 returns the step 530 where the AR engine 502 receives first user input to associate one or more layers and/or effects with another story fragment.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for dynamic location update delivery including the particular steps of the method of FIG. 5, this disclosure contemplates any suitable method for dynamic location update delivery including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
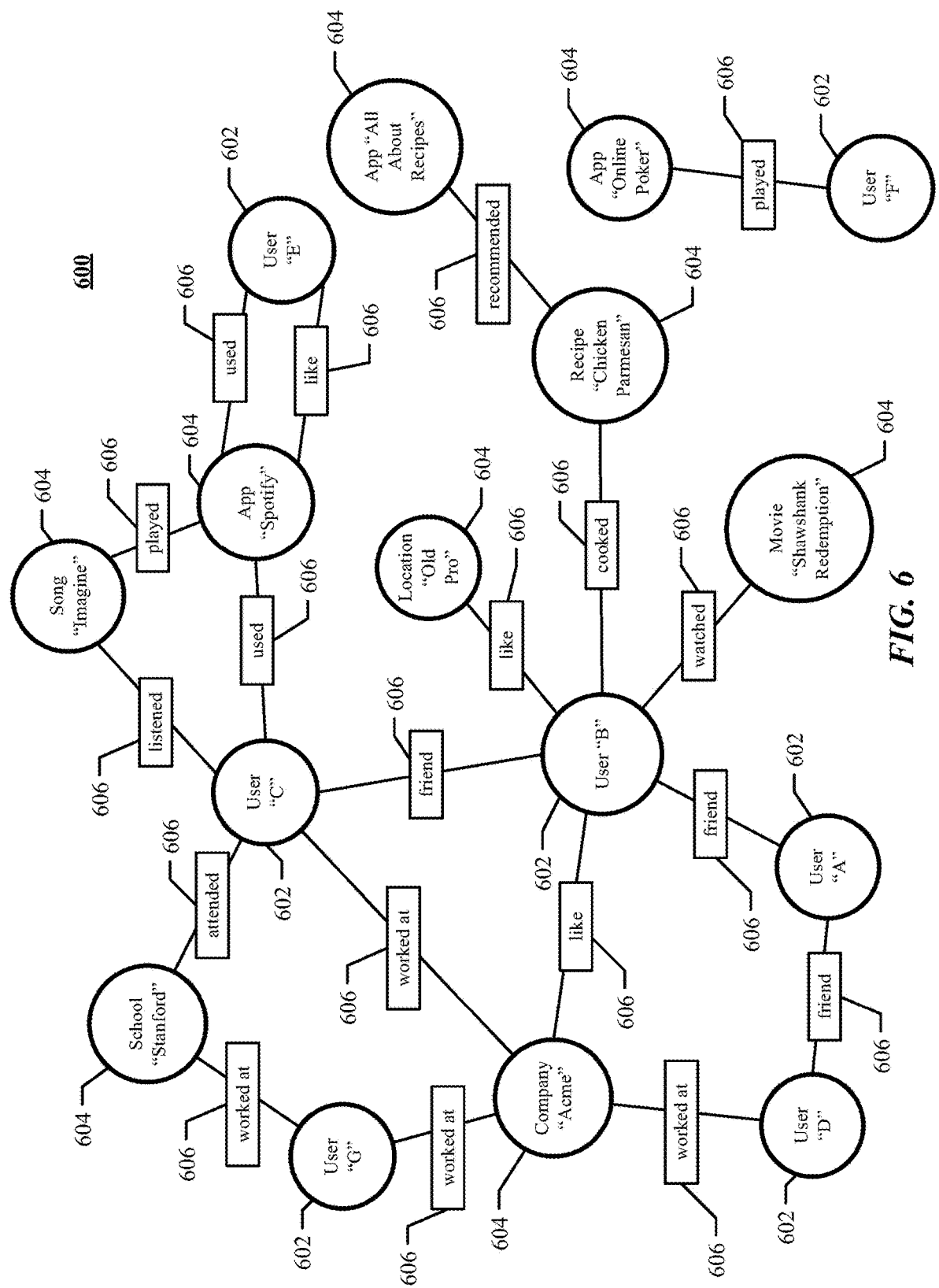
FIG. 6 illustrates example social graph.

FIG. 6 illustrates example social graph 600. In particular embodiments, social-networking system 160 may store one or more social graphs 600 in one or more data stores. In particular embodiments, social graph 600 may include multiple nodes—which may include multiple user nodes 602 or multiple concept nodes 604—and multiple edges 606 connecting the nodes. Each node may be associated with a unique entity (i.e., user or concept), each of which may have a unique identifier (ID), such as a unique number or username. Example social graph 600 illustrated in FIG. 6 is shown, for didactic purposes, in a two-dimensional visual map representation. In particular embodiments, a social-networking system 160, client system 130, or third-party system 170 may access social graph 600 and related social-graph information for suitable applications. The nodes and edges of social graph 600 may be stored as data objects, for example, in a data store (such as a social-graph database). Such a data store may include one or more searchable or queryable indexes of nodes or edges of social graph 600.

In particular embodiments, a user node 602 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 602 corresponding to the user, and store the user node 602 in one or more data stores. Users and user nodes 602 described herein may, where appropriate, refer to registered users and user nodes 602 associated with registered users. In addition or as an alternative, users and user nodes 602 described herein may, where appropriate, refer to users that have not registered with social-networking system 160. In particular embodiments, a user node 602 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more webpages.

In particular embodiments, a concept node 604 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 604 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 604. In particular embodiments, a concept node 604 may correspond to one or more webpages.

In particular embodiments, a node in social graph 600 may represent or be represented by a webpage (which may be referred to as a "profile page"). Profile pages may be hosted by or accessible to social-networking system 160. Profile pages may also be hosted on third-party websites associated with a third-party system 170. As an example and not by way of limitation, a profile page corresponding to a particular external webpage may be the particular external webpage and the profile page may correspond to a particular concept node 604. Profile pages may be viewable by all or a selected subset of other users. As an example and not by way of limitation, a user node 602 may have a corresponding user-profile page in which the corresponding user may add content, make declarations, or otherwise express himself or herself. As another example and not by way of limitation, a concept node 604 may have a corresponding concept-profile page in which one or more users may add content, make declarations, or express themselves, particularly in relation to the concept corresponding to concept node 604.

In particular embodiments, a concept node 604 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 602 corresponding to the user and a concept node 604 corresponding to the third-party webpage or resource and store edge 606 in one or more data stores.

In particular embodiments, a pair of nodes in social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 606 connecting the first user's user node 602 to the second user's user node 602 in social graph 600 and store edge 606 as social-graph information in one or more of data stores 164. In the example of FIG. 6, social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 600 by one or more edges 606. The degree of separation between two objects represented by two nodes, respectively, is a count of edges in a shortest path connecting the two nodes in the social graph 600. As an example and not by way of limitation, in the social graph 600, the user node 602 of user "C" is connected to the user node 602 of user "A" via multiple paths including, for example, a first path directly passing through the user node 602 of user "B," a second path passing through the concept node 604 of company "Acme" and the user node 602 of user "D," and a third path passing through the user nodes 602 and concept nodes 604 representing school "Stanford," user "G," company "Acme," and user "D." User "C" and user "A" have a degree of separation of two because the shortest path connecting their corresponding nodes (i.e., the first path) includes two edges 606.

In particular embodiments, an edge 606 between a user node 602 and a concept node 604 may represent a particular action or activity performed by a user associated with user node 602 toward a concept associated with a concept node 604. As an example and not by way of limitation, as illustrated in FIG. 6, a user may "like," "attended," "played," "listened," "cooked," "worked at," or "watched" a concept, each of which may correspond to an edge type or subtype. A concept-profile page corresponding to a concept node 604 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 606 and a "used" edge (as illustrated in FIG. 6) between user nodes 602 corresponding to the user and concept nodes 604 corresponding to the song and application to indicate that the user listened to the song and used the application. Moreover, social-networking system 160 may create a "played" edge 606 (as illustrated in FIG. 6) between concept nodes 604 corresponding to the song and the application to indicate that the particular song was played by the particular application. In this case, "played" edge 606 corresponds to an action performed by an external application (SPOTIFY) on an external audio file (the song "Imagine"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604 for "SPOTIFY").

In particular embodiments, social-networking system 160 may create an edge 606 between a user node 602 and a concept node 604 in social graph 600. As an example and not by way of limitation, a user viewing a concept-profile page (such as, for example, by using a web browser or a special-purpose application hosted by the user's client system 130) may indicate that he or she likes the concept represented by the concept node 604 by clicking or selecting a "Like" icon, which may cause the user's client system 130 to send to social-networking system 160 a message indicating the user's liking of the concept associated with the concept-profile page. In response to the message, social-networking system 160 may create an edge 606 between user node 602 associated with the user and concept node 604, as illustrated by "like" edge 606 between the user and concept node 604. In particular embodiments, social-networking system 160 may store an edge 606 in one or more data stores. In particular embodiments, an edge 606 may be automatically formed by social-networking system 160 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 604 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, a third-party system 170, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 204 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 200. A privacy setting may be specified for one or more edges 206 or edge-types of the social graph 200, or with respect to one or more nodes 202, 204 or node-types of the social graph 200. The privacy settings applied to a particular edge 206 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 204 connected to a user node 202 of the first user by an edge 206. The first user may specify privacy settings that apply to a particular edge 206 connecting to the concept node 204 of the object, or may specify privacy settings that apply to all edges 206 connecting to the concept node 204. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 may access such information in order to provide a particular function or service to the first user, without the social-networking system 160 having access to that information for any other purposes. Before accessing, storing, or using such objects or information, the social-networking system 160 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160.

In particular embodiments, a user may specify whether particular types of objects or information associated with the first user may be accessed, stored, or used by the social-networking system 160. As an example and not by way of limitation, the first user may specify that images sent by the first user through the social-networking system 160 may not be stored by the social-networking system 160. As another example and not by way of limitation, a first user may specify that messages sent from the first user to a particular second user may not be stored by the social-networking system 160. As yet another example and not by way of limitation, a first user may specify that all objects sent via a particular application may be saved by the social-networking system 160.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 may provide default privacy settings with respect to each device, system, or application, and/or the first user may be prompted to specify a particular privacy setting for each context. As an example and not by way of limitation, the first user may utilize a location-services feature of the social-networking system 160 to provide recommendations for restaurants or other places in proximity to the user. The first user's default privacy settings may specify that the social-networking system 160 may use location information provided from a client device 130 of the first user to provide the location-based services, but that the social-networking system 160 may not store the location information of the first user or provide it to any third-party system 170. The first user may then update the privacy settings to allow location information to be used by a third-party image-sharing application in order to geo-tag photos.

Privacy Settings for Mood, Emotion, or Sentiment Information

In particular embodiments, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The social-networking system 160 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular embodiments, the social-networking system 160 may use a user's previous activities and calculated moods, emotions, or sentiments to determine a present mood, emotion, or sentiment. A user who wishes to enable this functionality may indicate in their privacy settings that they opt in to the social-networking system 160 receiving the inputs necessary to determine the mood, emotion, or sentiment. As an example and not by way of limitation, the social-networking system 160 may determine that a default privacy setting is to not receive any information necessary for determining mood, emotion, or sentiment until there is an express indication from a user that the social-networking system 160 may do so. By contrast, if a user does not opt in to the social-networking system 160 receiving these inputs (or affirmatively opts out of the social-networking system 160 receiving these inputs), the social-networking system 160 may be prevented from receiving, collecting, logging, or storing these inputs or any information associated with these inputs. In particular embodiments, the social-networking system 160 may use the predicted mood, emotion, or sentiment to provide recommendations or advertisements to the user. In particular embodiments, if a user desires to make use of this function for specific purposes or applications, additional privacy settings may be specified by the user to opt in to using the mood, emotion, or sentiment information for the specific purposes or applications. As an example and not by way of limitation, the social-networking system 160 may use the user's mood, emotion, or sentiment to provide newsfeed items, pages, friends, or advertisements to a user. The user may specify in their privacy settings that the social-networking system 160 may determine the user's mood, emotion, or sentiment. The user may then be asked to provide additional privacy settings to indicate the purposes for which the user's mood, emotion, or sentiment may be used. The user may indicate that the social-networking system 160 may use his or her mood, emotion, or sentiment to provide newsfeed content and recommend pages, but not for recommending friends or advertisements. The social-networking system 160 may then only provide newsfeed content or pages based on user mood, emotion, or sentiment, and may not use that information for any other purpose, even if not expressly prohibited by the privacy settings.

Privacy Settings for Ephemeral Sharing

In particular embodiments, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular embodiments, for particular objects or information having privacy settings specifying that they are ephemeral, the social-networking system 160 may be restricted in its access, storage, or use of the objects or information. The social-networking system 160 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the social-networking system 160 may temporarily store the message in a data store 164 until the second user has viewed or downloaded the message, at which point the social-networking system 160 may delete the message from the data store 164. As another example and not by way of limitation, continuing with the prior example, the message may be stored for a specified period of time (e.g., 2 weeks), after which point the social-networking system 160 may delete the message from the data store 164.

Privacy Settings Based on Location

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

Privacy Settings for User-Authentication and Experience-Personalization Information In particular embodiments, the social-networking system 160 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160. The user's privacy settings may specify that such information may be used only for particular processes, such as authentication, and further specify that such information may not be shared with any third-party system 170 or used for other processes or applications associated with the social-networking system 160. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 170 or used by other processes or applications associated with the social-networking system 160.

User-Initiated Changes to Privacy Settings

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system 160 may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system 160 may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system 160 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system 160 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system 160 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system 160 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system 160 may send a reminder to the user to confirm his or her privacy settings every six months or after every ten photo posts. In particular embodiments, privacy settings may also allow users to control access to the objects or information on a per-request basis. As an example and not by way of limitation, the social-networking system 160 may notify the user whenever a third-party system 170 attempts to access information associated with the user, and require the user to provide verification that access should be allowed before proceeding.

Figure 7:
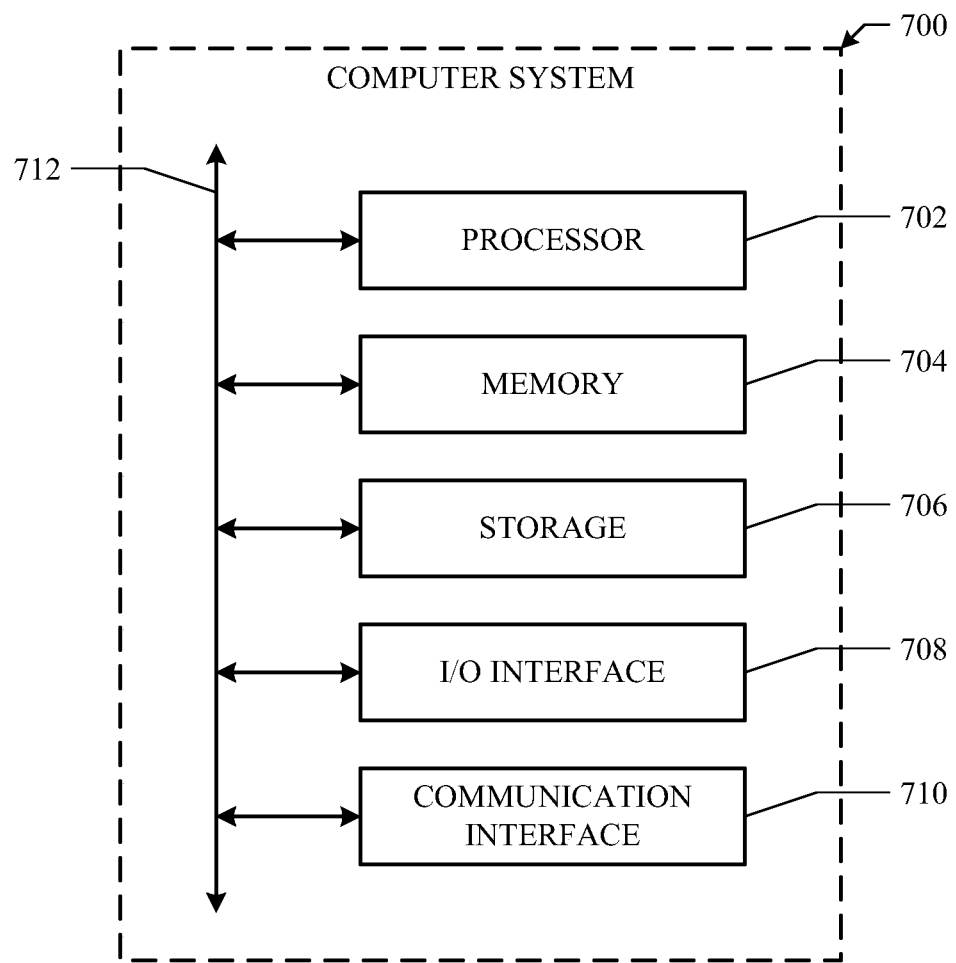
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The claims:

1. A method comprising:
by one or more computing systems, receiving a first story fragment from a storyteller interface of a first computing system associated with a storyteller, wherein the first story fragment is displayed within a first background layer depicting a first physical environment of the storyteller;

by the one or more computing systems, displaying the first story fragment on an audience interface of a second computing system associated with an audience, wherein the first story fragment is displayed within a second background layer depicting a second physical environment of the audience;

by the one or more computing systems, detecting a trigger relating to the audience interface of the second computing system, wherein the trigger corresponds to the first story fragment;

by the one or more computing systems, identifying a special effect associated with the trigger; and by the one or more computing systems, outputting the special effect and the first story fragment on at least one of the storyteller interface displayed on the first computing system and the audience interface displayed on the second computing system, wherein outputting the special effect on the storyteller interface comprises modifying the identified special effect based on the first physical environment, and wherein outputting the special effect on the audience interface comprises modifying the identified special effect based on the second physical environment.

2. The method of claim 1, wherein a trigger comprises one or more of a gesture, an audio sound, a voice sound, a time interval, a contact event, a proximity, and a context.

3. The method of claim 1, wherein a special effect comprises one or more of a visual layer, a visual effect, an audio layer, and an audio effect.

4. The method of claim 1, further comprising:
determining a privacy setting associated with at least one of the storyteller and the audience; and
based on the privacy setting, filtering story fragments and special effects displayed on the audience interface.

5. The method of claim 2, further comprising:
selecting a default privacy setting based on an age of a user, wherein the user comprises one of the audience and the storyteller and the default privacy setting is strict if the user is a minor; and
based on the privacy setting, turning off one or more triggers.

6. The method of claim 1, wherein a pre-scripted story is divided into a set of segments of one or more granularity levels, wherein the first story fragment is an element of the set of segments.

7. The method of claim 6, further comprising:
detecting a second trigger;
responsive to detecting the second trigger, selecting a second story fragment from the set of segments for display; and
displaying the second story fragment on the audience interface.

8. The method of claim 7, wherein selecting the second story fragment comprises:
identifying a branch point of the pre-scripted story;
selecting a branch of the story based on the second trigger;
selecting a subset of the set of segments corresponding to the selected branch; and
selecting the second story fragment from the selected subset.

9. The method of claim 8, wherein selecting the second story fragment further comprises:
identifying the branch point of the pre-scripted story;
displaying the storyteller interface on the second computing system;
receiving a selection via the storyteller interface of the branch of the story; and
selecting the second story segment corresponding to the selected branch.

10. The method of claim 1, wherein the audience interface displays public information and private information, wherein public information is displayed on both the audience interface and the storyteller interface and private information is displayed on one of the audience interface and the storyteller interface.

11. The method of claim 7, further comprising:
receiving a third trigger;
identifying a previous branch point of the pre-scripted story;
inferring a branch of the pre-scripted story at the previous branch point to select;
selecting a third story fragment from a subset of the set of segments corresponding to the inferred branch; and
displaying the third story fragment.

12. The method of claim 1, comprising a third computing system, wherein the third computing system displays the audience interface and wherein the audience display of the audience interface displayed on the third computing system displays the self-display of the audience interface displayed on the second computing system and wherein the audience display of the audience interface displayed on the second computing system displays the self-display of the audience interface displayed on the third computing system.

13. The method of claim 12, further comprising:
receiving a selection menu on the audience interface displayed on the second computing system and the third computing system, wherein the selection menu corresponds to an audience poll;
receiving user data corresponding to the audience poll;
identifying the special effect based on the user data;
outputting the special effect on the audience interface displayed on the second computing system and the third computing system.

14. The method of claim 13, wherein the user data corresponds to one or more of an activity level, an excitement level, a sound level, a sound pitch, and a majority selection.

15. The method of claim 1, wherein the audience interface comprises one or more of a story control menu, a visual display, a self-display, a story timeline indicator, and a storyteller display, and wherein a size of a storyteller display on the audience interface is increased responsive to a change in one or more of an activity level, a facial expression, and a sound level detected by the storyteller interface.

16. The method of claim 12, further comprising increasing a size of an audience display on a second system responsive to a change in one or more of an activity level, a facial expression, and a sound level detected by the audience interface on the third system.

17. The method of claim 12, wherein one or more of the audience display and the storyteller display displayed on the second computing system are blocked or limited based on a privacy setting of the storyteller interface displayed on the first computing system or a privacy setting of the audience interface displayed on the third computing system.

18. The method of claim 15, further comprising recording content from one or more of the story control menu, the visual display, the self-display, the story timeline indicator, and the storyteller display.

19. One or more non-transitory computer-readable storage media embodying software that is operable when executed by a server computing system to:

receive a first story fragment from a storyteller interface of a first computing system associated with a storyteller, wherein the first story fragment is displayed within a first background layer depicting a first physical environment of the storyteller;

display the first story fragment on an audience interface of a second computing system associated with an audience, wherein the first story fragment is displayed within a second background layer depicting a second physical environment of the audience;

detect a trigger on the audience interface of the second computing system, wherein the trigger corresponds to the first story fragment;

identify a special effect associated with the trigger; and output the special effect and the first story fragment on at least one of the storyteller interface displayed on the first computing system and the audience interface displayed on the second computing system, wherein outputting the special effect on the storyteller interface comprises modifying the identified special effect based on the first physical environment, and wherein outputting the special effect on the audience interface comprises modifying the identified special effect based on the second physical environment.

20. A system comprising:

a client system of a user;

one or more processors; and a memory coupled to the processors comprising instructions executable by the processors, the processors being operable when executing the instructions to:

receive a first story fragment from a storyteller interface of a first computing system associated with a storyteller, wherein the first story fragment is displayed within a first background layer depicting a first physical environment of the storyteller;

display the first story fragment on an audience interface of a second computing system associated with an audience, wherein the first story fragment is displayed within a second background layer depicting a second physical environment of the audience;

detect a trigger on the audience interface of the second computing system, wherein the trigger corresponds to the first story fragment;

identify a special effect associated with the trigger; and output the special effect and the first story fragment on at least one of the storyteller interface displayed on the first computing system and the audience interface displayed on the second computing system, wherein outputting the special effect on the storyteller interface comprises modifying the identified special effect based on the first physical environment, and wherein outputting the special effect on the audience interface comprises modifying the identified special effect based on the second physical environment.

* * * * *